INVENTORS
J. R. MARCUS
O. F. WARNING
BY
ATTORNEY

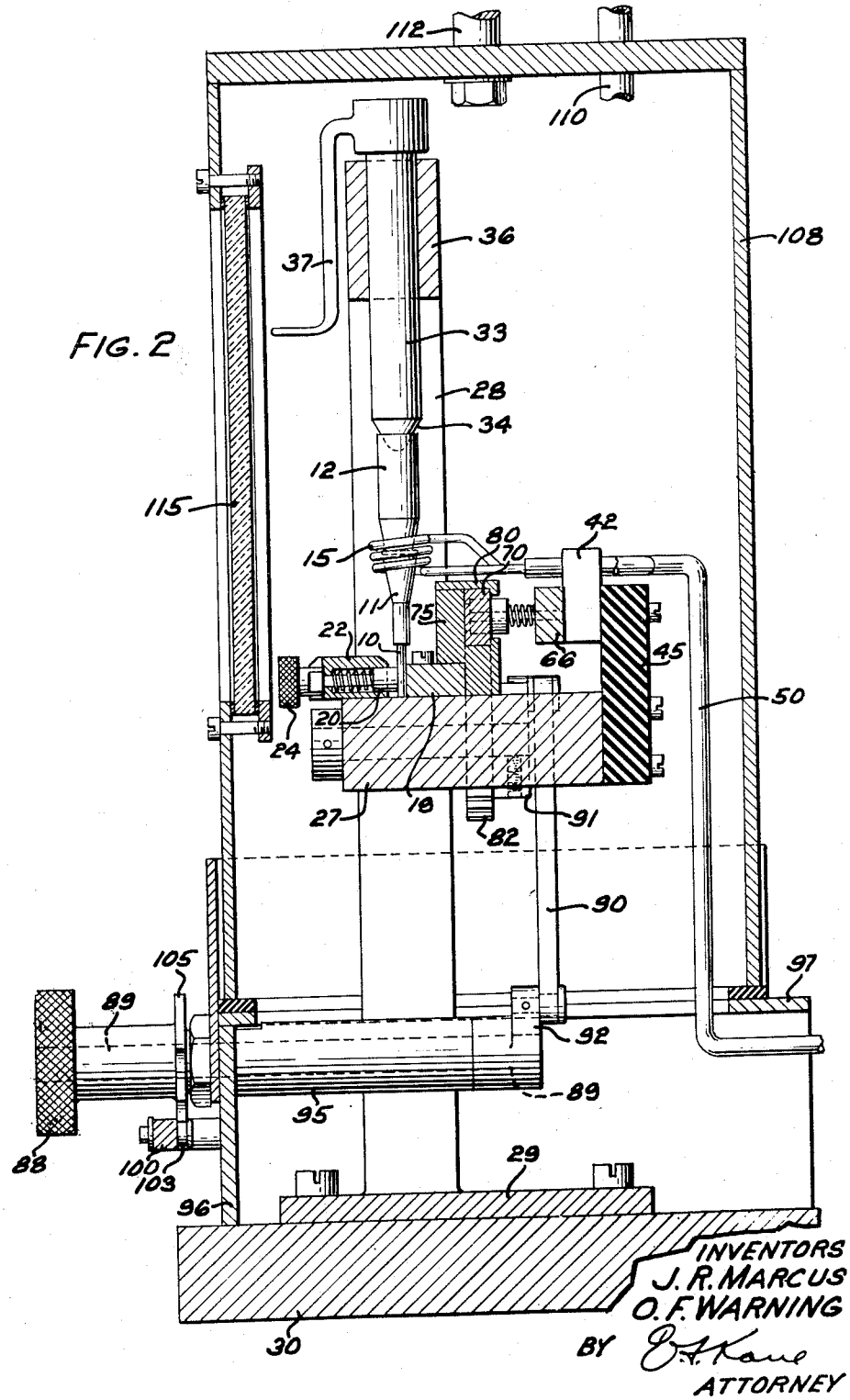

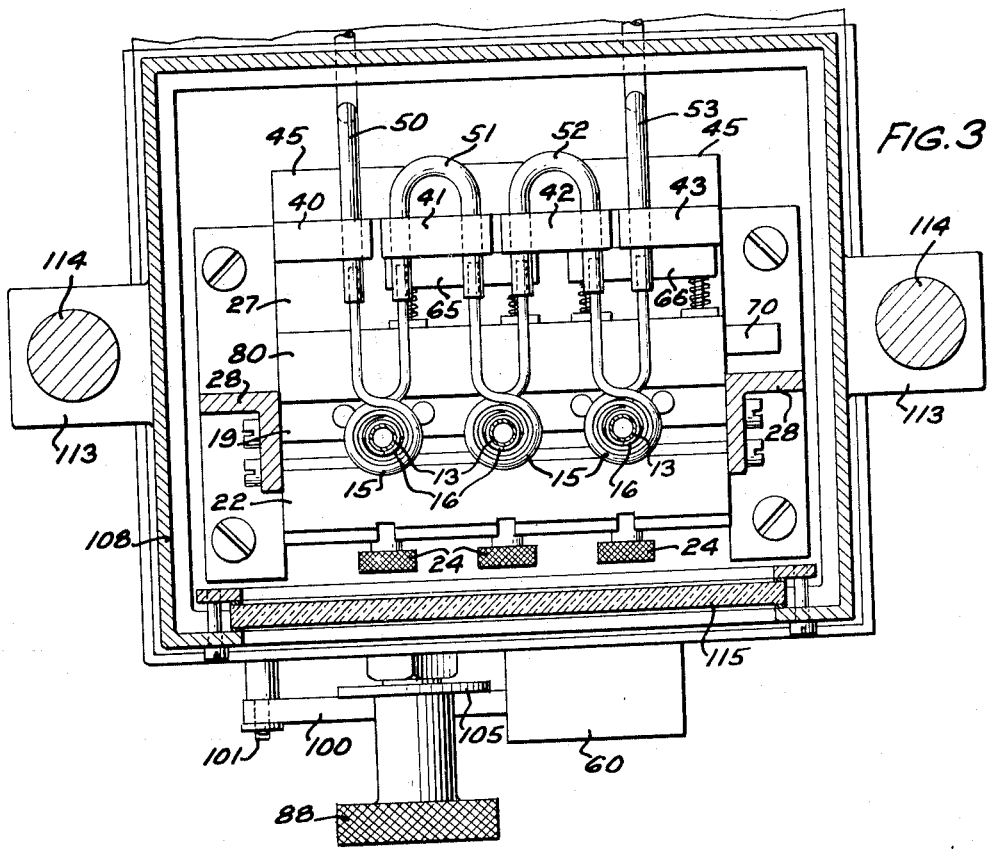
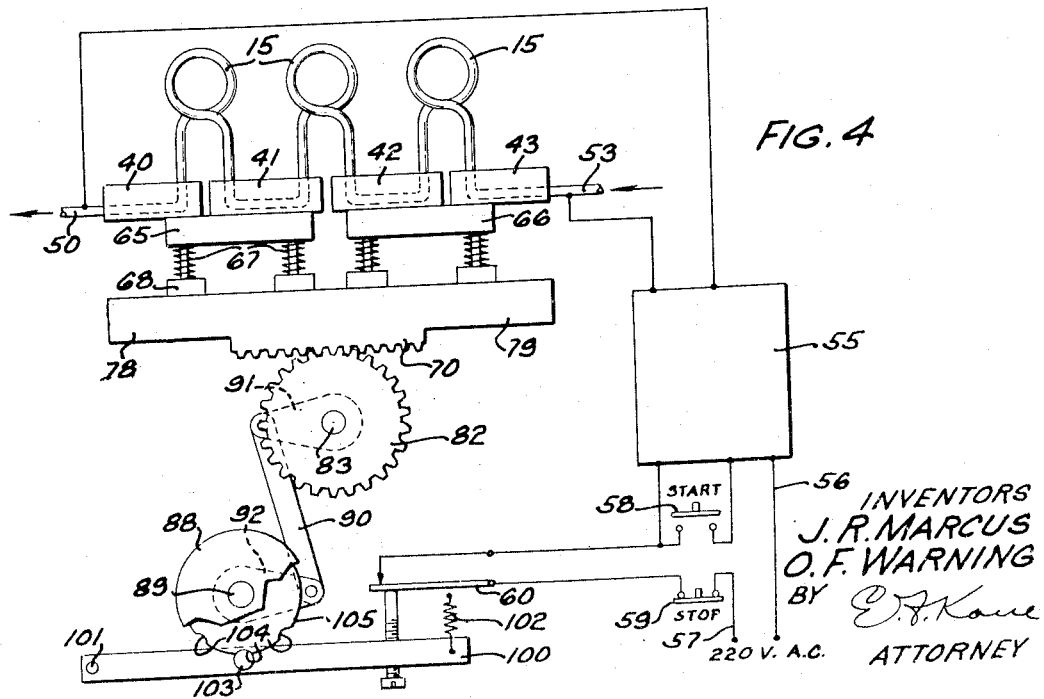

Feb. 7, 1950     J. R. MARCUS ET AL     2,496,950
HIGH-FREQUENCY HEATING APPARATUS FOR SEQUENTIALLY BRAZING
A PLURALITY OF PARTS IN A PROTECTIVE ATMOSPHERE
Filed July 31, 1946     4 Sheets-Sheet 4
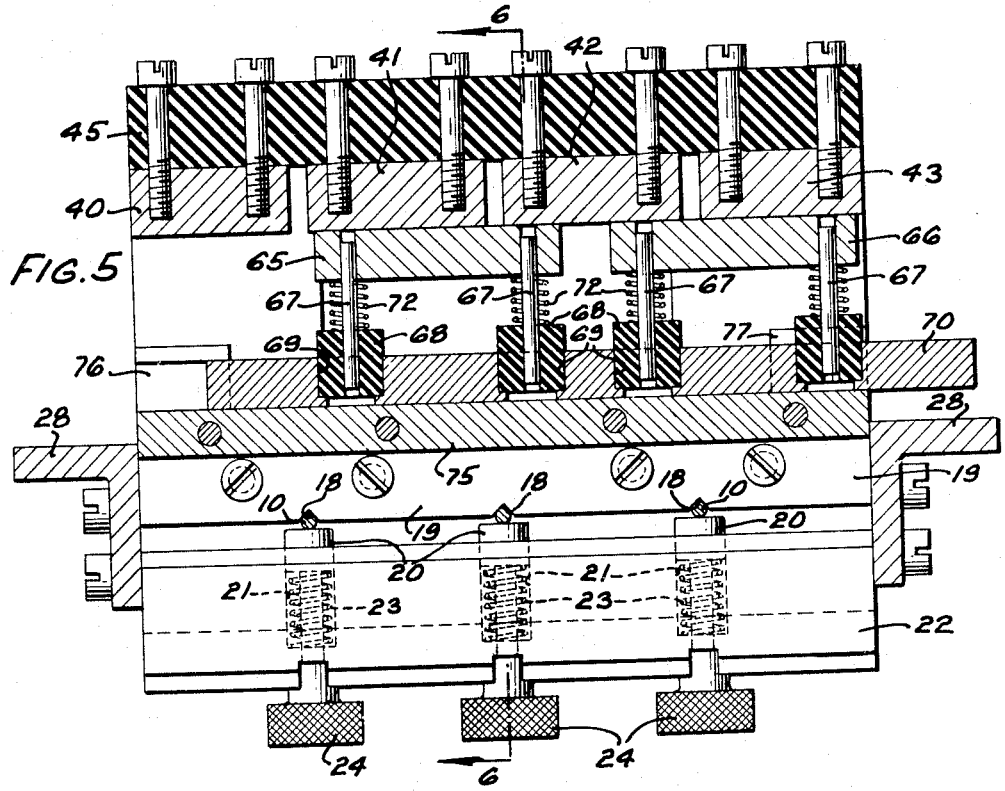
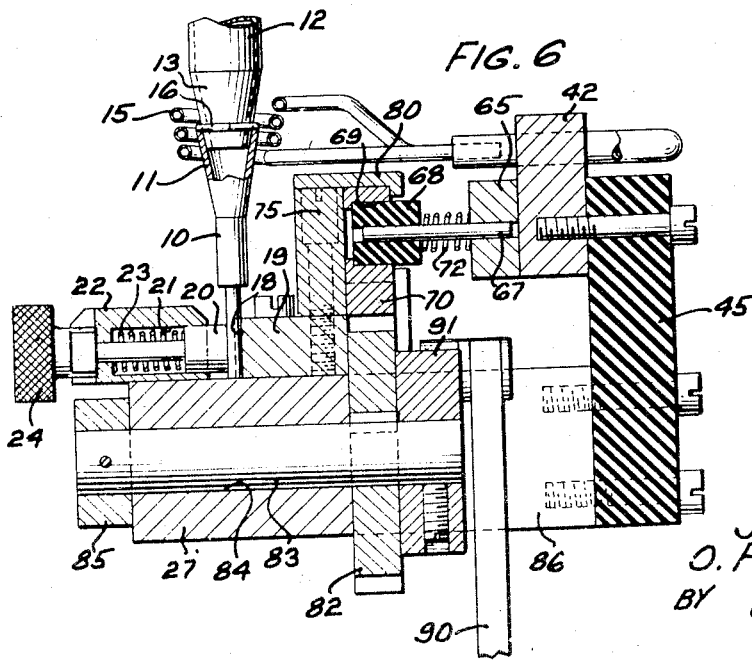
INVENTORS
J. R. MARCUS
O. F. WARNING
BY
ATTORNEY Patented Feb. 7, 1950

2,496,950

UNITED STATES PATENT OFFICE 2,496,950

HIGH-FREQUENCY HEATING APPARATUS FOR SEQUENTIALLY BRAZING A PLURALITY OF PARTS IN A PROTECTIVE ATMOSPHERE

Jerome R. Marcus, Chicago, and Orville F. Warning, Melrose Park, Ill., assignors to Western Electric Company, Incorporated, New York, N. Y., a corporation of New York Application July 31, 1946, Serial No. 687,434

6 Claims. (Cl. 219—47)

This invention relates to a high frequency heating apparatus and more particularly to a high frequency induction brazing apparatus for brazing successive ones of a group of articles in a protective atmosphere.

It is an object of the present invention to provide a simplified and improved high frequency heating apparatus having a series of successively operable coils.

In one embodiment of the invention, there is provided, in a chamber containing a protective atmosphere, a plurality of heating coils connected in series to a high frequency alternating current generator and clamping members for holding the parts to be brazed in position within the coils. The coils are provided with commutator bars which are slidably engaged by brushes for shorting out all of the coils except a selected one to effectively electrically connect only the selected coil to the high frequency generator. The brushes are insulated from and carried by a reciprocable rack bar, which is connected to a manually actuatable control handle on the outside of the chamber so that by turning the handle through predetermined arcs, the various heating coils may be effectively and successively connected individually into the high frequency circuit. A switch, connected in the electric power line to the high frequency generator, is opened to stop the operation of the high frequency current generator when the control handle is actuated to move the shorting brushes to another position to effectively connect a different coil into the high frequency circuit.

A more complete understanding of the invention may be had by reference to the following detailed description and the accompanying drawings illustrating a preferred embodiment thereof in which Fig. 1 is a front elevational view of the brazing apparatus with parts broken away and showing the parts to be brazed in position therein and the movable hood in its raised position;

Fig. 2 is a vertical sectional view through the apparatus taken on the line 2—2 of Fig. 1 in the direction of the arrows and showing the movable hood in its lowered position;

Fig. 3 is a horizontal sectional view of the apparatus taken on the line 3—3 of Fig. 1 with the hood in the lowered position therein and showing the three heating coils connected in series;

Fig. 4 is a diagrammatic view showing the heating coils connected to a high frequency generator and showing the shorting brushes for shorting out two of the coils and the control means for shifting the shorting bars and for opening the electric power supply circuit to the high frequency generator when the shorting brushes are being shifted;

Fig. 5 is an enlarged plan sectional view of a portion of the apparatus taken on the line 5—5 of Fig. 1; and Fig. 6 is a fragmentary vertical sectional view taken on the line 6—6 of Fig. 5 in the direction of the arrows.

Figure 1:
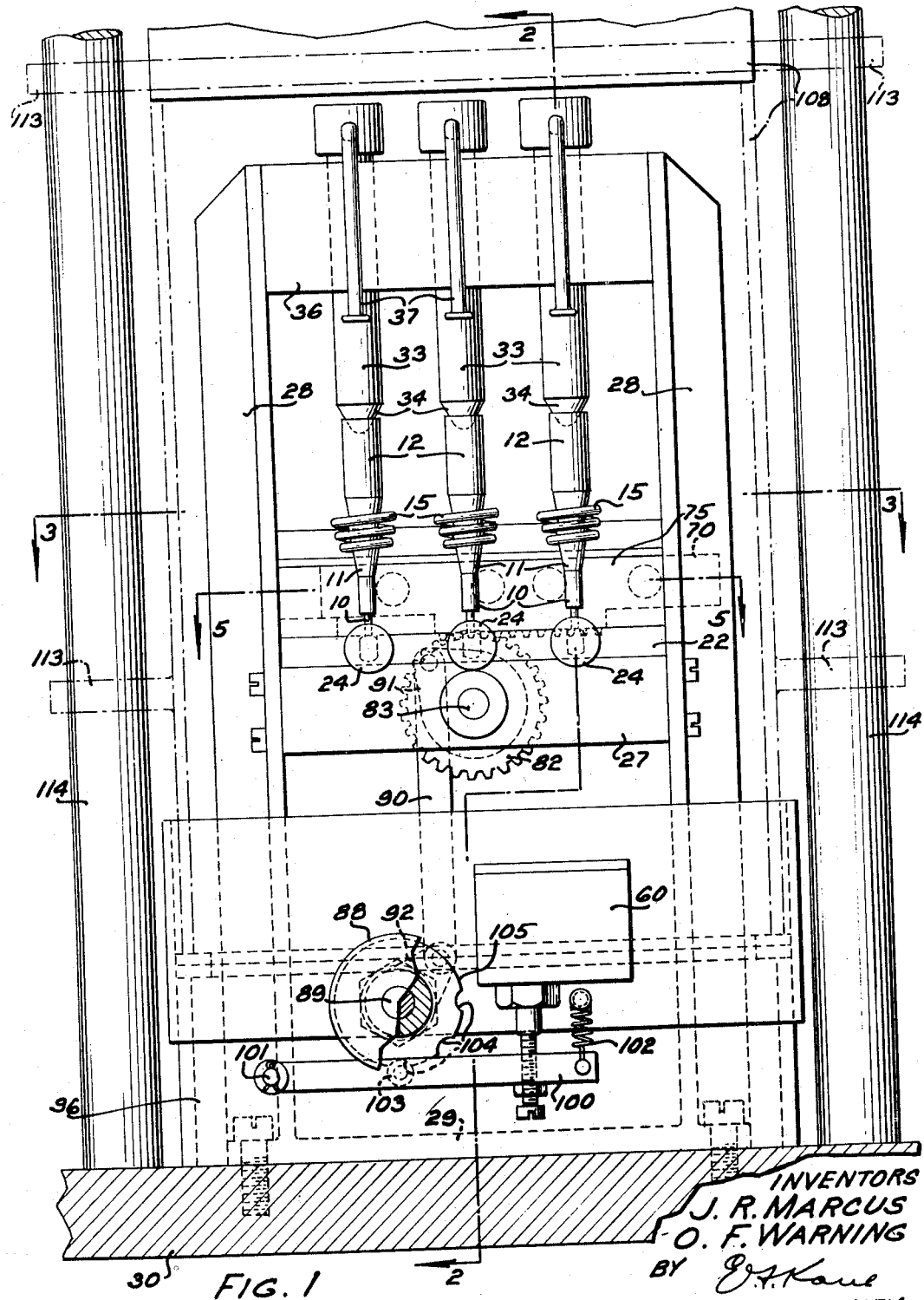

In high frequency induction brazing apparatus, where a protective atmosphere is employed to prevent oxidation of the parts being brazed, it is desirable to braze a plurality of parts with one setting of the apparatus, thereby increasing the output of the apparatus and reducing the wastage of protective gas incident to the loading and unloading of the apparatus with the articles being brazed. In many instances, it is not possible nor desirable to simultaneously braze a series of parts and the parts are brazed separately under control of the operator who watches the brazing process to prevent the part from becoming overheated.

The apparatus illustrated in the drawings is used for successively brazing a plurality of stem members 10 (Figs. 1, 2 and 6) having flared or conical-shaped skirts 11 to hollow cylindrical members 12 having tapered or conical-shaped ends 13. The parts 10 and 12 are axially aligned in high frequency heating coils 15 with the conical portions 11 and 13 centrally located therein, as shown in Fig. 6. A ring of solder or brazing metal 16 is positioned on the upper edge of each of the skirts 11 and during the brazing operation the solder or brazing metal ring 16 fuses to braze the conical portions 11 and 13 of the parts together.

The lower parts 10 are placed in V-shaped grooves 18 in a stationary bar 19 and are held therein by plungers 20 reciprocable within recesses 21 in a bar 22. The plungers 20 are urged forwardly by springs 23 and are provided with knobs 24 by means of which the plungers may be retracted. Bars 19 and 22 are secured to a supporting plate 27 fixed to a pair of uprights 28—28 of a frame 29 secured to a base plate 30. The upper parts 12 to be welded are maintained in proper position with respect to the lower parts 10 by axially aligned positioning members 33 having cone-shaped lower ends 34 for engaging the ends of and centering the parts 12. The positioning members 33 are slidably mounted in a supporting member 36 secured to the upper end of the uprights 28—28 and are provided with handles 37 attached to the upper end thereof and extending downwardly therefrom in a position accessible to the operator. The weight of the positioning member 33 is such as to maintain the proper pressure between the parts 12 and 10 during the brazing operation.

The coils 15 (Figs. 3 and 6) are secured to and supported by metal blocks or commutator bars 40, 41, 42 and 43, which are separated from each other and are secured to a vertically disposed plate 45 of insulating material mounted on the rear face of the supporting plate 27. The heating coils 15 are hollow to permit the circulation of a coolant therethrough and the ends thereof are secured to enlarged fluid and electric current conducting tubes 50, 51, 52 and 53, as shown in Fig. 3. The end conductor tubes 50 and 53 are secured to the end blocks 40 and 43, respectively, and the U-shaped conductor tubes 51 and 52 are secured to the conductor blocks 41 and 42, respectively.

The coils 15, which are connected in series with each other, are connected through the conduits 50 and 53 to an electronic oscillator 55 (Fig. 4), which is adapted to generate and supply a high frequency alternating current thereto. The high frequency generator 55 is connected to a source of power through the leads 56—57 and the operation of the high frequency generator is initiated by the actuation of a start switch 58 in the power line 57. The period of operation of the high frequency generator may be limited by a timing control within the oscillator unit 55 or the operation may be terminated sooner by the manual actuation of a stop switch 59 or a second stop switch 60 connected in series in the line 57. It will thus be seen that the coils 15 are connected in series with the oscillator 55 which supplies high frequency alternating current thereto for heating the articles positioned within the coils.

Switching means are provided for effectively connecting only one of the coils 15 at one time to the high frequency generator 55 and comprises a pair of brushes or electrically conducting shorting blocks 65 and 66 slidably engaging the blocks 40, 41, 42 and 43 to selectively short out any two of the heating coils 15 from the high frequency circuit. The brushes 65 and 66 are each slidably mounted on a pair of pins 67—67 rigidly secured in insulating blocks 68 mounted in recesses 69 of a reciprocable rack bar 70. The brushes 65 and 66 are urged against the commutator blocks which are connected close to the coils 15 to obtain a minimum length of high frequency current path by coil springs 72—72 interposed between the bars 65 and 66 and the insulating blocks 68. By moving the rack bar 70 to various predetermined positions the brushes 65 and 66 are caused to move therewith and engage various ones of the commutator bars 40 to 43 and short out two of the heating coils 15 to effectively connect the remaining coil to the high frequency generator 55.

The rack bar 70 is mounted for reciprocation in a guide member 75 (Figs. 2 and 5) mounted on the bar 19 and the supporting plate 27 and formed at its ends with laterally projecting guideways 76 and 77 for receiving the reduced ends 78 and 79, respectively, of the rack bar 70. A retaining plate 80, secured to the guide bar 75, serves to maintain the rack bar in position. Meshing with the teeth of the rack bar is a gear 82 (Figs. 1, 2 and 6) fixed to a shaft 83 mounted for rotation in a bore 84 of the supporting plate 27 and retained on the plate by a collar 85. The supporting plate 27 is recessed at 86 to provide clearance for the gear 82. The shaft 83 is oscillated to effect reciprocatory movement of the brushes 65 and 66 by actuation of a control handle 88 (Figs. 1 and 2) fixed to the outer end of a control shaft 89 mounted below and in spaced relation to the shaft 83 and connected thereto through a link 90 pivoted at its ends to a pair of levers 91 and 92 secured to the shafts 83 and 89, respectively. The shaft 89 is rotatably mounted in a bearing 95 fixed in the front wall 96 of a stationary housing 97 mounted on the base plate 30. It will be apparent that by turning the control handle 88 through predetermined arcs, the gear 82 will be caused to oscillate to move the rack bar 70 and the brushes 65 and 66 to predetermined positions to control the shorting out of two of the heating coils 15 and effect the connecting of the remaining coil 15 to the high frequency generator 55.

Means are provided for opening the switch 60 in the power line 57 during the movement of the brushes 65 and 66 to insure that the coils 15 are not energized during the switching of the coils into and out of the high frequency circuit should the operator neglect to actuate the stop switch 59 or if the electronic oscillator 55 is not cut out by the automatic timing mechanism contained therein. The normally open switch 60, which may be of the micro-switch type, is maintained in a closed position by the engagement therewith of a lever 100 pivoted at 101 on the wall 96 and urged in a counter-clockwise direction by a spring 102. A roller 103, carried by the lever 100 intermediate its ends, engages in one of the notches 104 of a cam disc 105 secured to the shaft 89. When the handle 88 is turned to short out one heating coil 15 from the high frequency circuit and connect another into the circuit, the rotation of the cam disc 105 will move the lever 100 in a clockwise direction and permit the opening of the switch 60 to stop the operation of the oscillator 55 and thereby deenergize the coils 15. The action of the roller 103 being forced into the notches 104 under spring pressure serves to indicate when the brushes 65 and 66 are properly positioned and also to maintain the brushes in their set positions.

Since it is desirable to perform the brazing of the parts in a protective atmosphere, such as hydrogen, a movable bell or hood 108 is provided which, in cooperation with the stationary housing 97, forms a chamber for receiving the hydrogen gas which is admitted into the chamber through a pipe 110 in the top of the movable hood 108. The hood 108 is adapted to be raised and lowered by a connecting rod 112 secured to the top thereof and is guided for vertical movement by laterally extending apertured guide lugs 113 secured thereto and engaging vertical guide rods 114 mounted on the base 30. A window 115 is provided in the front wall of the bell 108 through which the operator may observe the articles being welded.

In the operation of the welding apparatus the hood 108 is raised to the position shown in full lines in Fig. 1, in which position the welding apparatus is accessible to the operator. The parts 10 and 12 to be brazed, together with the solder or brazing metal rings 16, are placed in position within the individual heating coils 15, the parts 10 being securely clamped between the members 19 and 20 and the upper parts 12 being held in position by the lowering of the holding members 33 into engagement with the upper ends thereof.

With the three sets of parts 10 and 12 properly positioned within the coils 15, the hood 108 may be lowered to the position shown in Fig. 2, and the hydrogen gas allowed to flow into the chamber and displace the air therefrom. With two of the heating coils 15 shorted out of the circuit and the third coil 15 connected in the circuit to the high frequency generating unit, the operator, by pressing the start button 58, may cause the high frequency current to flow through the heating coil 15 then in the circuit. By observing the parts 10 and 12 being heated, the operator, when he has determined that the parts have been heated to the proper degree, may actuate the stop button 59 to stop the flow of current to the heating coil 15. By turning the operating handle 88 the operator may effectively disconnect the first heating coil 15 from the high frequency circuit and connect a second heating coil therein, after which he may push the start button 58 to initiate another brazing cycle to braze the second set of the parts 10 and 12 in the apparatus. The third set of parts 10 and 12 is similarly brazed. On completion of the brazing of the three sets of parts, the hood 108 may be raised and the brazed parts removed from the apparatus.

What is claimed is:

1. A high frequency heating apparatus for brazing successive ones of a series of articles in a protective atmosphere comprising a chamber for containing said protective atmosphere, a plurality of heating coils in said chamber connected in series to a source of high frequency current, holders for holding said articles in position in said heating coils, commutator members connected to said coils, brushes for engaging said commutator members to short circuit some of said coils, and control means extending outside of said chamber for effecting a relative movement between said commutator members and said brushes for selectively and successively short-circuiting some of the coils to sequentially energize the coils.

2. In a high frequency heating apparatus for brazing successive ones of a series of articles, a plurality of heating coils connected in series to a source of high frequency current, holders for holding said articles in position in said heating coils, commutator members connected to said coils, brushes engageable with said commutator members for short circuiting some of said coils, and control means for effecting a relative movement between said commutator members and said brushes for selectively and successively short circuiting some of the coils to sequentially energize the coils.

3. A high frequency heating apparatus for brazing successive ones of a series of parts in a protective atmosphere comprising a chamber for said protective atmosphere, a plurality of heating coils in said chamber connected in series to a source of high frequency current, holders for holding said parts in position to said coils, commutator members connected to said coils, brushes for engaging various ones of said commutator members to short out all of said heating coils except one, and control means extending outside of said chamber for selectively actuating said brushes to effectively connect any one of said coils to said source of high frequency current and short out the other coils.

4. A high frequency heating apparatus for brazing successive ones of a series of parts in a protective atmosphere comprising a chamber for said protective atmosphere, a plurality of heating coils in said chamber connected in series, holders for holding said parts in position in said coils, a pair of commutator members connected to each of said coils, brushes engaging said commutator members for shorting out all of said heating coils except one, a high frequency alternating current generator connected in series with said coils, a switch connecting said high frequency generator to a power supply, and control means extending outside of said chamber for moving said brushes to short out all of the heating coils except a selected one and for simultaneously actuating the switch to arrest the operation of said high frequency generator during the movement of said brushes.

5. A high frequency heating apparatus for brazing succesive ones of a series of parts in a protecting atmosphere comprising a chamber for said protective atmosphere, a plurality of heating coils connected in series in said chamber, holders for holding said parts in position in said coils, commutator members in said chamber connected to the leads of each of said coils, brushes in said chamber engageable with said commutator members for selectively and successively short circuiting some of said heating coils, a high frequency alternating current generator connected in series with said coils, a switch connecting said high frequency generator to a power supply, and a control means extending outside of said chamber for moving said brushes for selectively and successively short circuiting some of the coils to sequentially energize said heating coils for simultaneously actuating the switch to arrest the operation of said high frequency generator during the movement of said brushes.

6. In a high frequency heating apparatus for brazing successive ones of a series of articles in a protective atmosphere, a chamber for containing said protective atmosphere, a plurality of heating coils in said chamber connected in series to a source of high frequency current, holders for holding said articles in position in said heating coils, commutator members in said chamber connected in close proximity to said heating coils, brushes in the chamber for engaging said commutator members for short circuiting some of said coils, and control means extending outside of said chamber for effecting a relative movement between said commutator members and said brushes for selectively and successively short circuiting some of the coils to sequentially energize the coils.

JEROME R. MARCUS.
ORVILLE F. WARNING.

REFERENCES CITED

The following references are of record in the file of this patent:

UNITED STATES PATENTS

| Number | Name | Date |
| --- | --- | --- |
| 1,190,308 | Levy | July 11, 1916 |
| 1,696,684 | Knopp | Dec. 25, 1928 |
| 1,878,458 | Blanchet | Sept. 20, 1932 |
| 1,946,876 | Northrup | Feb. 13, 1934 |
| 2,009,380 | Berger | July 30, 1935 |
| 2,184,282 | Capita | Dec. 26, 1939 |
| 2,228,600 | Hardy | Jan. 14, 1941 |
| 2,302,119 | Hagedorn | Nov. 17, 1942 |
| 2,321,189 | Dravneek | June 8, 1943 |